United States Patent Office 3,444,219
Patented May 13, 1969

3,444,219
PURIFICATION OF 9- (AND 10-) ACRYLAMIDOSTEARIC ACID
David P. Sheetz and Terry D. Filer, Midland, Mich., assignors to The Dow Chemical Company, Midland, Mich., a corporation of Delaware
No Drawing. Filed Nov. 14, 1966, Ser. No. 593,665
Int. Cl. C08g 20/06; C07c 57/02
U.S. Cl. 260—404    2 Claims

ABSTRACT OF THE DISCLOSURE

This invention relates to the purification of 9- (and 10-) acrylamidostearic acid by removal of contaminants with certain solvents.

---

This invention is concerned with the removal of contaminants such as stearic and other saturated acids which remain in the product obtained by converting oleic acid to acrylamidostearic acid by reaction with acrylonitrile in the presence of sulfuric acid, for example, by the process of U.S. Patent 2,701,809.

The oleic acid starting material employed for the preparation of 9- (and 10-) acrylamidostearic acid is contaminated with stearic and other saturated acids which go through the reactions unchanged. The crude product, therefore, contains contaminants largely comprising saturated fatty acids and some unreacted oleic acid. These contaminants are troublesome in the subsequent use of the product as, for example, in the preparation of synthetic polymer latexes.

It has now been found that the selective removal of these impurities can be effected by extraction of the crude product with a liquid having a solubility parameter of from about 8.1 to about 8.7, where the solubility parameter is as defined by J. L. Hildebrand and R. L. Scott in "Solubility of Nonelectrolytes," Reinhold Pub. Co., 1950.

Solvents which meet this requirement include, for example, cyclohexane, cyclopentane, methyl chloride, ethyl chloride, methyl chloroform, dimethoxymethane, carbon tetrachloride, and mixtures such as, for example, cyclohexane with benzene, preferably in a volume ratio of from 1:1 to 2:1. Extractants with solubility parameters above about 8.7 tend to dissolve product and contaminants indiscriminately. Those having solubility parameters below about 8.1 are less effective in dissolving the impurities.

The ratio of extractant to crude product is not critical, but an appreciable amount, usually at least 1 volume extractant per volume of product, must be used to obtain a significant improvement in product quality. The temperature is not critical but is advantageously less than about 50° C. to minimize polymerization of the product.

The invention is further illustrated by the following examples.

Preparation of crude 9- (and 10-) acrylamidostearic acid

To 1240 g. (12.0 moles) of 95% aqueous $H_2SO_4$ in a 3 l. flask was added in a dropwise manner with stirring and cooling 325 g. (6.0 moles) of acrylonitrile at a temperature of from 10 to 20° C. and then 564 g. of oleic acid, analyzed to be 100% by potentiometric titration for carboxylic acid and 97.0% by iodine for unsaturation, also at a temperature of from 10 to 20° C. The reaction mixture was maintained at 30° C. for 3 hours and then added with stirring to 3 l. of a 50/50 water/ice mixture. After 24 hours the aqueous layer was removed by decantation, the product washed 3 times successively with 3 l. portions of water and the product then allowed to stand in 3 l. of water for an additional 3 days. The crude product was separated from the aqueous phase.

Purification of crude 9- (and 10-) acrylamidostearic acid by extraction

The crude product contained 78 meq. of acrylamidostearic acid (AAS), as determined by Kjeldahl nitrogen analysis, per 100 meq. of total carboxylic acid (COOH) as determined by potentiometric titration. One hundred gram portions were each extracted 3 times successively with 200 ml. portions of a solvent of known solubility parameter. The products so obtained and the combined solvent phases were analyzed to determine the amount of AAS (by Kjeldahl nitrogen analysis) and contaminating carboxylic acid (by potentiometric titration) present in each. (The meq. of AAS in the solvent phase is reported as the difference between the content in the crude acid and in the purified product.) The results are summarized below.

| Solvent | Sol. Par. | Solvent phase | | Product | |
|---|---|---|---|---|---|
| | | Meq. unreacted COOH | Meq. AAS | Meq. unreacted COOH | Meq. AAS |
| n-Hexane | 7.2 | 9 | 0 | 13 | 78 |
| Cyclohexane | 8.2 | 13 | 0 | 9 | 78 |
| Cyclohexane/benzene (67/33)[1] | 8.5 | 15 | 5 | 7 | 73 |
| CCl$_4$ | 8.6 | 17 | 2 | 5 | 76 |
| Cyclohexane/benzene (50/50)[1] | 8.7 | 16 | 9 | 6 | 69 |
| Ethyl benzene | 8.8 | 21 | 37 | 1 | 41 |
| Benzene | 9.15 | 17 | 33 | 5 | 45 |

[1] Volume ratio.

The extraction is more efficient when conducted in a continuous counter-current manner.

We claim:
1. Process for the selective removal of impurities from 9- (and 10-) acrylamidostearic acid which comprises intimately contacting the crude product with an inert liquid having a solubility parameter of from about 8.1 to about 8.7 measured at 25° C., and separating the product phase from said inert liquid containing the impurities.
2. Process of claim 1 wherein the liquid is cyclohexane, carbon tetrachloride or a mixture of cyclohexane and benzene in a volume ratio of from 1:1 to 2:1.

References Cited

UNITED STATES PATENTS 2,701,809  2/1955  Plaut _____ 260—404

DANIEL D. HORWITZ, *Primary Examiner.*